Aug. 5, 1941.    W. H. FRANK ET AL    2,251,404
ELECTRICAL DISTRIBUTION SYSTEM
Filed Dec. 16, 1940

INVENTORS
William H. Frank
BY Joseph W. Harper
Daniel G. Cullen. ATTORNEY.

Patented Aug. 5, 1941

2,251,404

UNITED STATES PATENT OFFICE 2,251,404

ELECTRICAL DISTRIBUTION SYSTEM

William H. Frank and Joseph W. Harper, Detroit, Mich., assignors to Bulldog Electric Products Company, Detroit, Mich., a corporation of West Virginia Application December 16, 1940, Serial No. 370,252

6 Claims. (Cl. 173—334.1)

This application relates to electrical distribution systems, particularly to systems of the bus duct and plug type, and is a continuation in part of a prior application, Serial No. 264,354, filed March 27, 1939.

A bus duct system of the character under consideration comprises a quadrilateral cross section sheet metal duct containing bus bars and to which are secured plugs having contacts for engaging the bus bars. The duct is supported from fixed structure by suitable supporting means which thus supports the entire system, comprising the duct, the bus bars, and the plugs.

The duct hereof is made of two pairs of sheet metal parts which are joined, along longitudinal severance lines, by suitable joining means, such as screws or bolts, with the parts of each pair being identical.

The parts of the duct or casing, made of sheet metal, are provided with flanges. In the aggregate these flanges have the following functions:

1. To reinforce and rigidify the longitudinal edges of the casing parts.
2. To provide means whereby the casing parts may be joined on the longitudinal severance lines.
3. To provide formations to which the plugs may be secured.
4. To provide formations to which the supports for the duct may be secured.
5. To provide means whereby lengths of duct may be joined end to end.

Various formations of quadrilateral duct made up of four parts and having four flanges are here disclosed and will now be described with reference to the appended drawing. In the drawing, Fig. 1 is a longitudinal view of a fragment of bus duct showing the duct, the bus bars therein, a branch circuit plug, and a support for the duct;

Figs. 2 and 3 are sections on lines 2—2 and 3—3 of Fig. 1 and illustrate one specific cross section of duct;

Figs. 4-5 inclusive are cross sections illustrating other specific cross sections of duct;

Fig. 6 shows an end to end joint for lengths of duct according to Fig. 3.

The bus duct system shown in Figs. 1 to 3 is illustrative of all of the systems of this case and except for the specific form of cross section of the duct may be taken as typical. The system of these figures includes a sheet metal duct, referenced generally 10, within which, at longitudinally spaced points, are insulators 11 through which pass bus bars 12 for engagement by prongs 14 of branch circuit plugs, referenced generally 15. Screws 16 join the various parts of the duct to one another. Certain ones of the screws 16 hold plugs 15 on the duct, with the prongs passing through holes, not shown, of the sheet metal casing or duct.

The duct is supported from fixed structure as by means of supporting straps 17 secured thereto through certain ones of the screws 16.

In the construction of Figs. 1 to 3 the duct includes two flat plates 36—37 and two flanged plates 38—39. The four corners of the duct are thus formed to provide flanges through which pass the bolts 16 for securing parts 36—37—38—39 together and to which the supporting straps 17 may be secured. The flanges also reinforce the duct and its parts, not only at their edges, but also as a whole, because they project outwardly, like a box I section. In addition, they provide formations to which the plugs 15 may be secured.

As indicated in Figs. 1-3, these plugs and supports are secured to the top flanges. However, the supports and plugs may be secured to the bottom flanges rather than to the top flanges; or supports 17 may be secured to the top flanges and the plugs to the bottom flanges; or vice versa, all as desired.

Whereas in each of the instances illustrated the plugs and straps are on opposite sides of the duct, they might well be on the same side. Similarly, whereas the straps are shown above the duct, they might well be below the duct, functioning not to suspend the duct but to support it as if on a pedestal. In a specific instance, some plugs and supports might be on the same side, with others on the opposite side.

It will be observed that in every instance illustrated the duct comprises a longitudinally divided casing of elongated sheet metal casing parts, arranged in pairs, with the two parts of each pair being identical, that each duct has continuous flanges projecting from and extending longitudinally of the duct at edges of certain of said parts, that certain of said flanges reinforce such edges, that certain of said flanges are secured to one another by screws or the like to secure the casing parts together and thus form a duct, that the flanges enable duct lengths to be joined end to end, that to certain of said flanges the plugs are fastened and secured, and that to certain of said flanges the supports or straps are fastened.

Figure 1:
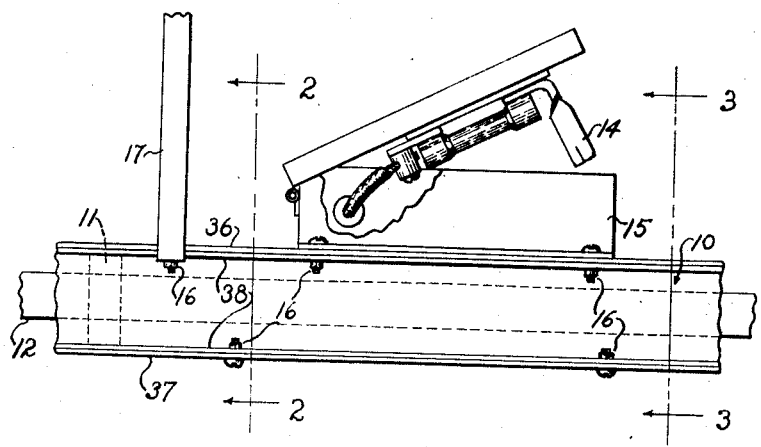
Figure 2:
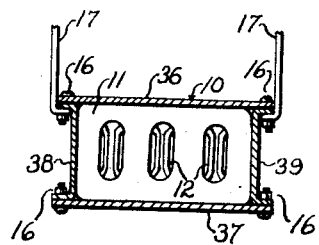
Figure 3:
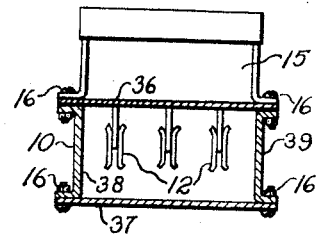
Figure 4:
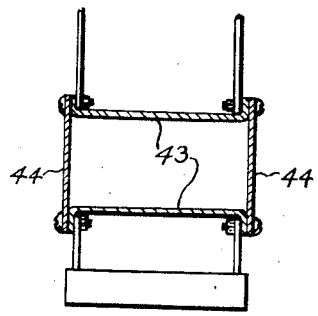
Fig. 4 shows a construction like that of Figs. 1-3 but differing slightly in that the flanges are provided on the top and bottom plates 43 rather than on the side plates 44.
Figure 5:
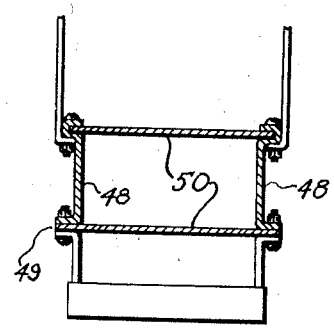
Fig. 5 shows a construction similar to Figs. 1-3 but wherein the flanges of the side members 48 are double folded as shown at 49 to embrace the edges of the top and bottom plates 50.
Figure 6:
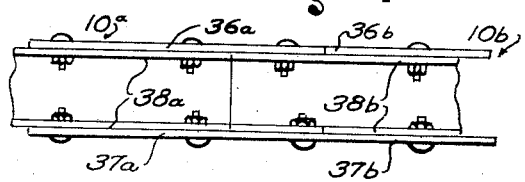

Fig. 6 shows a length $a$ of duct joined to a length $b$, end to end; at an end of length $a$, parts 36$a$ and 37$a$ are coterminous, and parts 38$a$ and 39$a$ are coterminous, but parts 36$a$—37$a$ are not coterminous with parts 38$a$—39$a$; thus a scarf lap joint is provided.

Now having described the bus duct system hereof, reference should be had to the claims which follow for a determination of the invention herein disclosed.

We claim:

1. An electrical distribution system of the bus duct and plug type comprising a longitudinally divided quadrilateral cross section casing or duct of four separate and distinct elongated sheet metal casing parts, formed of two pairs, with the two parts of each pair being similar, and the two pairs being different, bus bars in the duct and accessible through holes of the duct, and plugs adapted to be secured to the duct and having prongs entering the duct through the holes thereof and engaging the bus bars, continuous flanges projecting from and extending longitudinally of said duct at the four edges thereof, integral with said parts, the flanges being formed to permit plugs and duct supports to be secured directly to them, and to permit duct parts to be intersecured.

2. An electrical distribution system of the bus duct and plug type comprising a longitudinally divided quadrilateral cross section casing or duct of four separate and distinct elongated sheet metal casing parts, formed of two pairs, with the two parts of each pair being similar, and the two pairs being different, bus bars in the duct and accessible through holes of the duct, and plugs adapted to be secured to the duct and having prongs entering the duct through the holes thereof and engaging the bus bars, continuous flanges projecting from and extending longitudinally of said duct at the four edges thereof, integral with said parts, the flanges being formed to permit plugs and duct supports to be secured directly to them, and to permit duct parts to be intersecured, the plates of one pair being flat, and those of the other being U shaped.

3. An electrical distribution system of the bus duct and plug type comprising a longitudinally divided quadrilateral cross section casing or duct of two pairs of elongated sheet metal casing parts, with the two parts of each pair being identical, bus bars in the duct and accessible through holes of the duct, and plugs adapted to be secured to the duct and having prongs entering the duct through the holes thereof and engaging the bus bars, continuous flanges projecting from and extending longitudinally of said duct at the four edges thereof, the flanges being formed to permit plugs and duct supports to be secured directly to them, the plates of one pair being flat, and those of the other being U shaped, with the edges of the latter plates being double folded.

4. An electrical distribution system of the bus duct and plug type comprising a longitudinally divided quadrilateral cross section casing or duct of four separate and distinct elongated sheet metal casing parts, formed of two pairs, with the two parts of each pair being similar, and the two pairs being different, bus bars in the duct and accessible through holes of the duct, and plugs adapted to be secured to the duct and having prongs entering the duct through the holes thereof and engaging the bus bars, continuous flanges projecting from and extending longitudinally of said duct at the four edges thereof, integral with said parts, the flanges being formed to permit plugs and duct supports to be secured directly to them, and to permit duct parts to be intersecured, all four plates being of the same length, those of one pair being coterminous, those of the other pair being coterminous, and those of one pair not being coterminous with those of the other, whereby the flanges permit duct lengths to be joined end to end.

5. An electrical distribution system of the bus duct and plug type comprising a longitudinally divided quadrilateral cross section casing or duct of four separate and distinct elongated sheet metal casing parts, formed of two pairs, with the two parts of each pair being similar, and the two pairs being different, bus bars in the duct and accessible through holes of the duct, and plugs adapted to be secured to the duct and having prongs entering the duct through the holes thereof and engaging the bus bars, continuous flanges projecting from and extending longitudinally of said duct at the four edges thereof, integral with said parts, the flanges being formed to permit plugs and duct supports to be secured directly to them, and to permit duct parts to be intersecured, the plates of one pair being flat, and those of the other being U shaped, with the U shaped plates having holes through which access to bus bars in the duct may be obtained.

6. An electrical distribution system of the bus duct and plug type comprising a longitudinally divided quadrilateral cross section casing or duct of four separate and distinct elongated sheet metal casing parts, formed of two pairs, with the two parts of each pair being similar, and the two pairs being different, bus bars in the duct and accessible through holes of the duct, and plugs adapted to be secured to the duct and having prongs entering the duct through the holes thereof and engaging the bus bars, continuous flanges projecting from and extending longitudinally of said duct at the four edges thereof, integral with said parts, the flanges being formed to permit plugs and duct supports to be secured directly to them, and to permit duct parts to be intersecured, the plates of one pair being flat, and those of the other being U shaped, with the U shaped plates having holes through which access to bus bars in the duct may be obtained, all four plates being of the same length, those of one pair being coterminous, those of the other pair being coterminous, and those of one pair not being coterminous with those of the other, whereby the flanges permit duct lengths to be joined end to end.

WILLIAM H. FRANK.
JOSEPH W. HARPER.

Disclaimer 2,251,404.—*William H. Frank* and *Joseph W. Harper*, Detroit, Mich. ELECTRICAL DISTRIBUTION SYSTEM. Patent dated Aug. 5, 1941. Disclaimer filed Jan. 15, 1948, by the assignee, *Bulldog Electric Products Company*.

Hereby enters this disclaimer to claims 1 and 2 in said specification.

[*Official Gazette February 17, 1948.*]